US 11,983,241 B2

United States Patent
O'Connell et al.

(10) Patent No.: US 11,983,241 B2
(45) Date of Patent: May 14, 2024

(54) METHOD AND SYSTEM FOR TRAINING A NEURAL NETWORK

(71) Applicant: FotoNation Limited, Galway (IE)

(72) Inventors: Eoin O'Connell, Limerick (IE); Joseph Lemley, Galway (IE)

(73) Assignee: FotoNation Limited (IE)

( * ) Notice: Subject to any disclaimer, the term of this patent is extended or adjusted under 35 U.S.C. 154(b) by 589 days.

(21) Appl. No.: 17/189,035

(22) Filed: Mar. 1, 2021

(65) Prior Publication Data

US 2022/0277172 A1   Sep. 1, 2022

(51) Int. Cl.
| | |
|---|---|
| *G06F 18/214* | (2023.01) |
| *G06F 18/213* | (2023.01) |
| *G06N 3/08* | (2023.01) |
| *G06V 10/28* | (2022.01) |

(52) U.S. Cl.
CPC .......... *G06F 18/214* (2023.01); *G06F 18/213* (2023.01); *G06N 3/08* (2013.01); *G06V 10/28* (2022.01)

(58) Field of Classification Search
CPC ....... G06F 18/214; G06F 18/213; G06N 3/08; G06N 3/0464; G06N 3/084; G06V 10/28; G06V 10/454; G06V 10/774; G06V 10/82
USPC ....................................................... 382/157
See application file for complete search history.

(56) References Cited

U.S. PATENT DOCUMENTS 10,915,817 B2   2/2021   Bazrafkan et al.
11,341,361 B2 *  5/2022   Kubota ................ G06V 10/454
2020/0097742 A1 *  3/2020   Ratnesh Kumar ..... G06V 20/52
2020/0202533 A1 *  6/2020   Cohen ...................... G06T 7/194
2020/0226421 A1 *  7/2020   Almazan ................ G06N 3/045
2022/0261593 A1 *  8/2022   Yu .......................... G06N 3/088

OTHER PUBLICATIONS

Wei Liu, Dragomir Anguelov, Dumitru Erhan, Christian Szegedy, Scott Reed, Cheng-Yang Fu, Alexander C. Berg: "SSD: Single Shot Multi-Box Detector", arxiv.org/pdf/1512.02325, Dec. 29, 2016, 17 pages.
Abhishek Sinha, Kumar Ayush, Jiaming Song, Burak Uzkent, Hongxia Jin, Stefano Ermon: "Negative Data Augmentation", arxiv.org/abs/2102.05113, Feb. 9, 2021, 17 pages.
Zhi Tian, Chunhua Shen, Hao Chen Tong He "FCOS: Fully Convolutional One-Stage Object Detection", arxiv.org/pdf/1904.01355v5, Aug. 20, 2019, 13 pages.
Qijie Zhao, Tao Sheng, Yongtao Wang, Zhi Tang, Ying Chen, Ling Cai, Haibin Ling: "M2Det: A Single-Shot Object Detector based on Multi-Level Feature Pyramid Network", arXiv:1811.04533, V1, Jan. 6, 2019, 8 pages.

* cited by examiner

*Primary Examiner* — Juan A Torres
(74) *Attorney, Agent, or Firm* — Lerner David LLP

(57) ABSTRACT

A method for training a neural network for detecting a plurality of classes of object within a sample comprises providing a training data set comprising a plurality of samples, each annotated according to whether the samples include labelled objects of interest. In a first type of samples, all objects of interest are labelled according to their class and comprise a foreground of the samples, the remainder of the samples comprising background. In a second type of samples, some objects of interest are labelled in a foreground and their background may comprise unlabelled objects. A third type of samples comprise only background comprising no objects of interest. Negative mining is only performed on the results of processing the first and third types of samples.

15 Claims, 4 Drawing Sheets

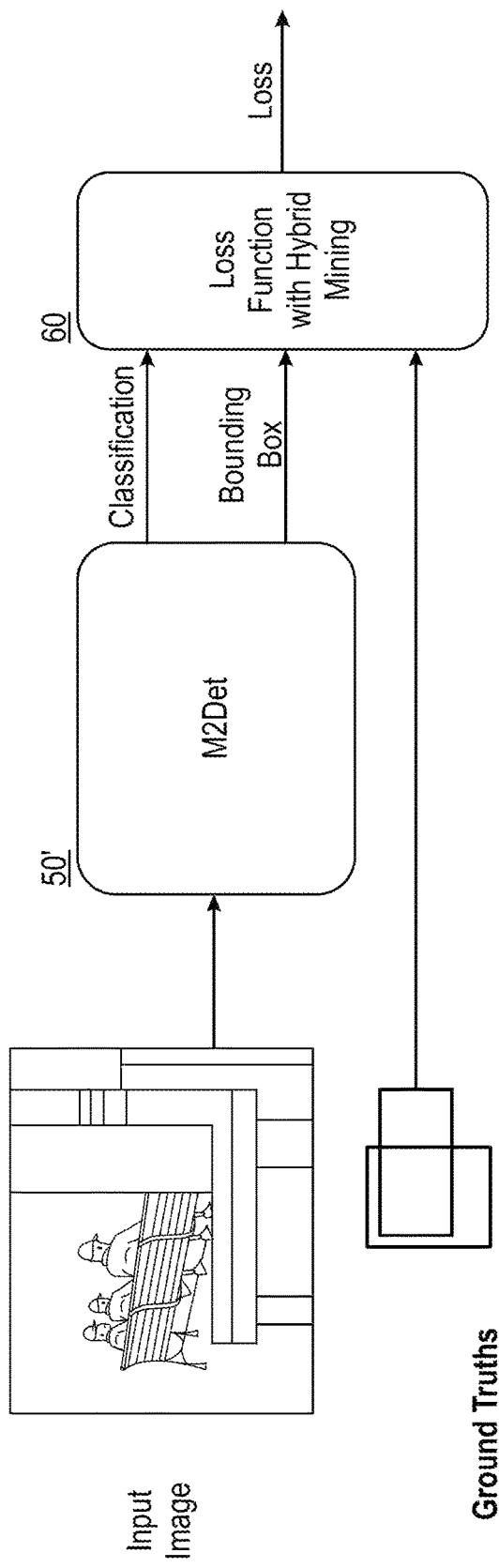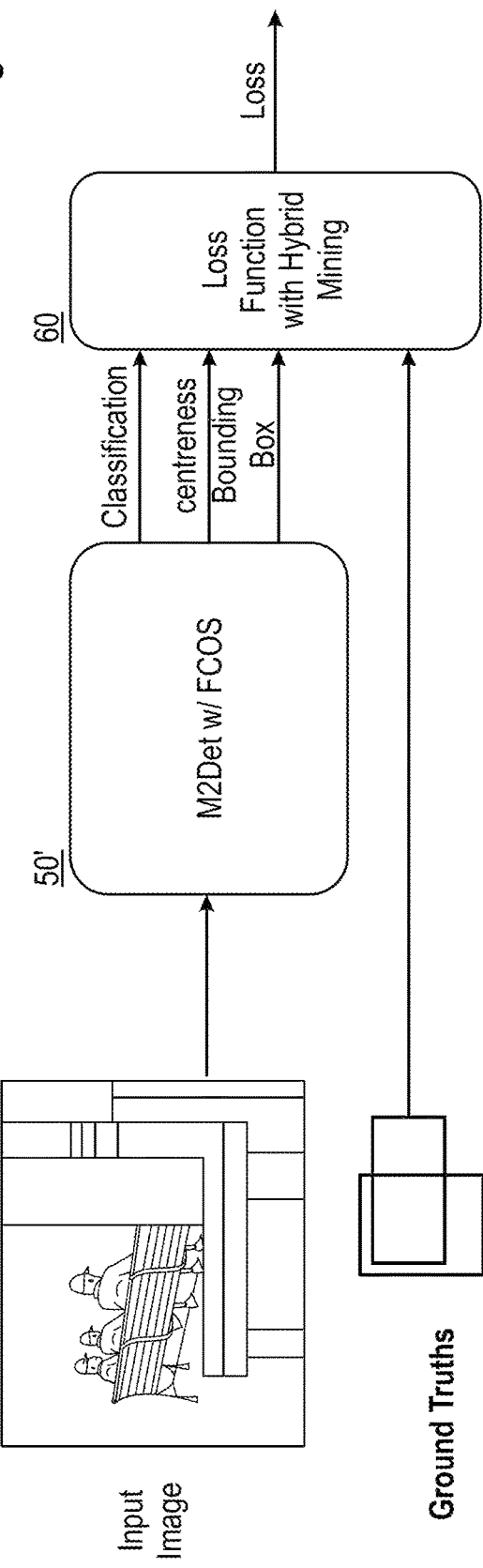

METHOD AND SYSTEM FOR TRAINING A NEURAL NETWORK

FIELD

The present invention relates to a method and system for training a neural network.

BACKGROUND

A major impediment in the training of neural network based object classifiers is providing a suitably large, completely annotated training data set. This is particularly so for multi-class object classifiers which are to be trained to identify regions of a sample, such as an image, comprising any of a number of different classes or types of objects.

So, for example, when attempting to train such a classifier to detect object types such as people and parcels in an image, it may not be possible, or it may be prohibitively difficult, to acquire a training data set in which all images have been annotated to identify regions corresponding to either people and/or parcels, referred to herein as "ground truths". This difficulty increases as the number of different types of objects to be classified increases.

At the same time, a useful technique in training a classifier is known as negative mining. Here, during training, regions of a training sample which do not coincide with ground truths are assumed to be background and so not to comprise objects of interest. This allows a loss function employed for training the network to take into account both potentially positive and potentially negative sample regions, to better and/or more quickly train to distinguish between objects of interest and those which are irrelevant.

By way of example in the field of object detection within images, "SSD: Single Shot Multi-Box Detector", Wei Liu, Dragomir Anguelov, Dumitru Erhan, Christian Szegedy, Scott Reed, Cheng-Yang Fu, Alexander C. Berg, arxiv.org/pdf/1512.02325 discloses a method for training a network where a small set of "default" boxes, for example, 4-6 boxes, of different aspect ratios and scales are evaluated by a network at each location of an image from a training data set. For positive mining, for each default box, the loss function can comprise a weighted sum of localization loss, i.e. how well a default box matches a ground truth location, and confidence/classification loss, i.e. the difference between a score, $0 \leq S \leq 1$ for the default box and the ground truth for which the score is 1.

A multi-box loss function can be employed with negative mining either enabled or disabled.

Referring now to FIG. 1, for any given image, processing by a neural network produces at least one feature map comprising a set of values indicating a confidence level produced by the network for a given object type of a given scale and aspect ratio at a given location within the image, i.e. for each default box. This information is contained in what is referred to as a "network output tensor" in the present application.

The network output tensor therefore enables a training system to determine a confidence level for a set of default boxes covering respective regions of an image for each of a set of classes of interest, step 1. (It will be appreciated that while the term default box is used in the present application, regions with shapes other than rectangles could be employed.)

In step 2, those default boxes produced by the network which overlap by more than a first threshold, say 50% with a ground truth are categorised as potential positive samples; whereas those which do not overlap with a ground truth are categorised as potential negative samples.

Each confidence level for a location of a positive sample can be compared with a respective ground truth (a score of 1) at step 3 to determine a positive sample classification loss, whereas the relative locations and co-extent of the default box and the ground truth are used to generate a localisation loss. One measure for localisation loss is Intersection over Union (IoU) comprising the area of overlap divided by area of union of the default box and the ground truth.

Where negative mining is enabled, confidence levels for a number of negative samples can be compared with a ground truth (a score of 0) to determine a negative classification loss, steps 4 & 5. Note that localisation loss is not necessary for negative samples. (Typically, the number of negative samples used is limited to a multiple, for example, 3 of the positive samples.)

The loss function for the image can then be calculated as a combination, typically a sum, of the positive and negative loss functions, step 7.

When negative mining is disabled, negative samples, are discarded, and so steps 4 & 5 are not performed—thus the background loss is set to 0.

Using the above example, however, employing negative mining with a training data set where some images were only labelled with people and others with only parcels would lead to an inaccurate result, as in images labelled with people, any unlabelled parcels appearing in the background would reduce the accuracy of the trained network in identifying parcels and vice versa for images labelled with parcels. Thus, if negative mining is being used to train a classifier, it is not advisable to add images to the training data set which have only been annotated with a new data type to expand the functionality of a given classifier, as this could be detrimental to the performance of the classifier with other data types.

In other approaches such as disclosed in U.S. Pat. No. 10,915,817 a target neural network is trained to augment the samples of a training data set in order to produce new artificial samples for training another network.

"Negative Data Augmentation", Abhishek Sinha, Kumar Ayush, Jiaming Song, Burak Uzkent, Hongxia Jin, Stefano Ermon, arxiv.org/abs/2102.05113, 9 Feb. 2021, discloses a technique for producing out-of-distribution samples lacking the typical structure of natural images to inform a model on what it should not learn.

It is an object of the present invention to mitigate the problems arising from the limited availability of completely labelled training data sets.

SUMMARY

According to a first aspect of the present invention, there is provided a method for training a neural network according to claim 1.

Embodiments enable partially annotated set of samples within a training set to be employed in training a neural network while at the same time employing negative mining.

Embodiments of the invention are based on training a network for classifying objects within images using a multi-box loss function.

In a second aspect, there is provided a system for training a neural network comprising a processor configured to perform the steps of claim 1.

In a third aspect, there is provided a computer program product comprising a computer readable medium comprising instructions which when executed by a processor of a computing device are configured to perform the steps of claim 1.

BRIEF DESCRIPTION OF THE DRAWINGS

Embodiments of the invention will now be described, by way of example, with reference to the accompanying drawings, in which:

FIG. 4 illustrates the method of FIG. 3 applied to an M2Det network; and FIG. 5 illustrates the method of FIG. 3 applied to an M2Det network with an FCOS head.

DESCRIPTION OF THE EMBODIMENT

Embodiments of the present invention will be described in terms of training a neural network for classifying objects within images using a multi-box loss function. However, it will be appreciated that the invention is equally applicable to other forms of loss function.

Figure 2:
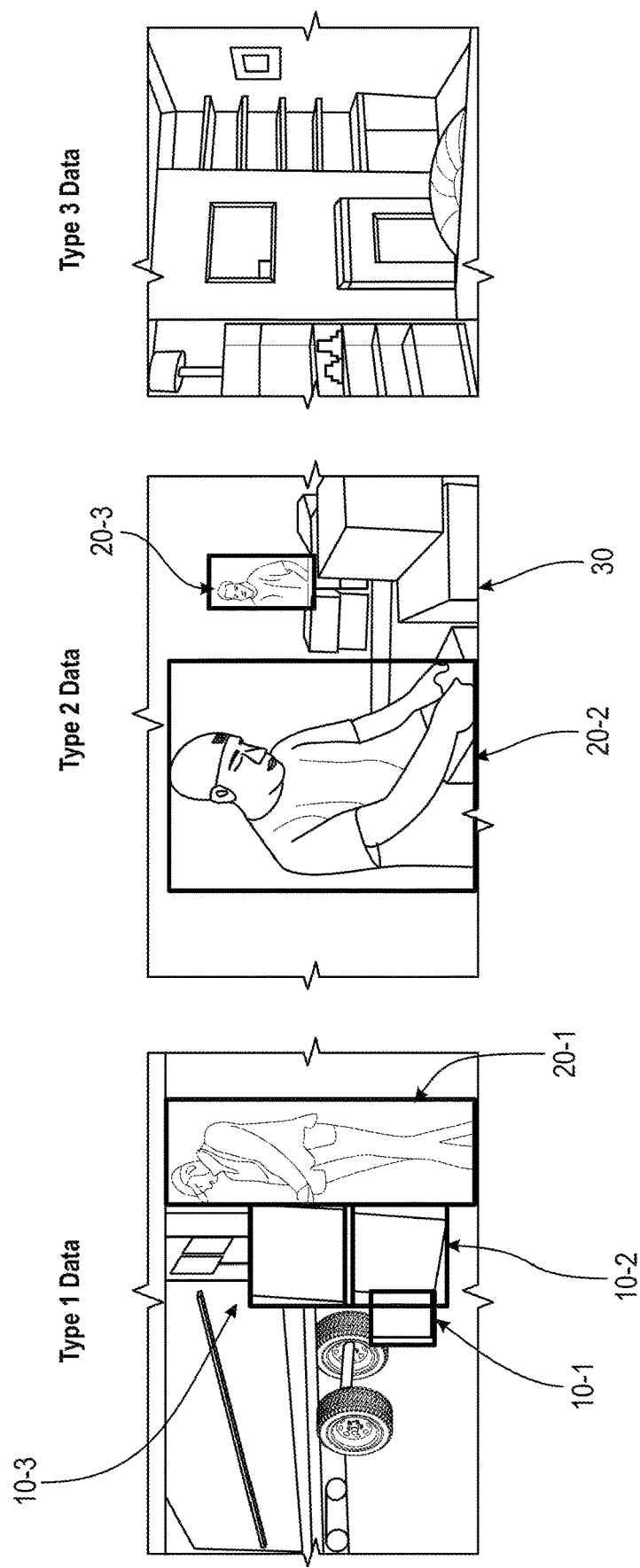
FIG. 2 illustrates different types of training data which can be available for training a neural network in accordance with an embodiment of the present invention.

Referring to FIG. 2, using the present invention, a training data set is divided into a number of different data types:

Type 1: Images in which all classes of interest are marked—in this case, an image has been annotated with a number of ground truths indicating regions 10-1, 10-2 and 10-3 corresponding to parcels and a region 20-1 corresponding to a person. Note that these regions do not have to correspond in size or aspect ratio to the default box sizes employed by the network, as it is the extent of overlap and location or possibly centeredness of a potential region detected by the network relative to the ground truth which is tested when determining the loss function. In any case, the network which is to be trained should not be concerned with detecting any other classes of object.

Type 2: Images in which only some classes of interest are marked or it is not certain if all are classes of interest are marked. Thus, in this example, a number of persons 20-2 and 20-3 have been annotated, whereas a number of parcels 30 have not. If the network being trained were to be expanded to detect classes other than people or parcels, the images categorised as Type 1 for the purposes of original training, would need to be categorised as Type 2 for training such a network, but as will be seen from the detailed explanation below, these can still be employed without compromising the accuracy of the trained network.

Type 3: Images known to contain none of the classes of interest. In the example, neither people nor parcels are contained within the image. Note that Type 3 data can comprise portions of images which are known not to contain ground truths and so background portions from Type 1 images can be used as Type 3 data. This can mean that no special manual effort needs to be made to produce Type 3 once Type 1 data for a network is available.

Figure 3:
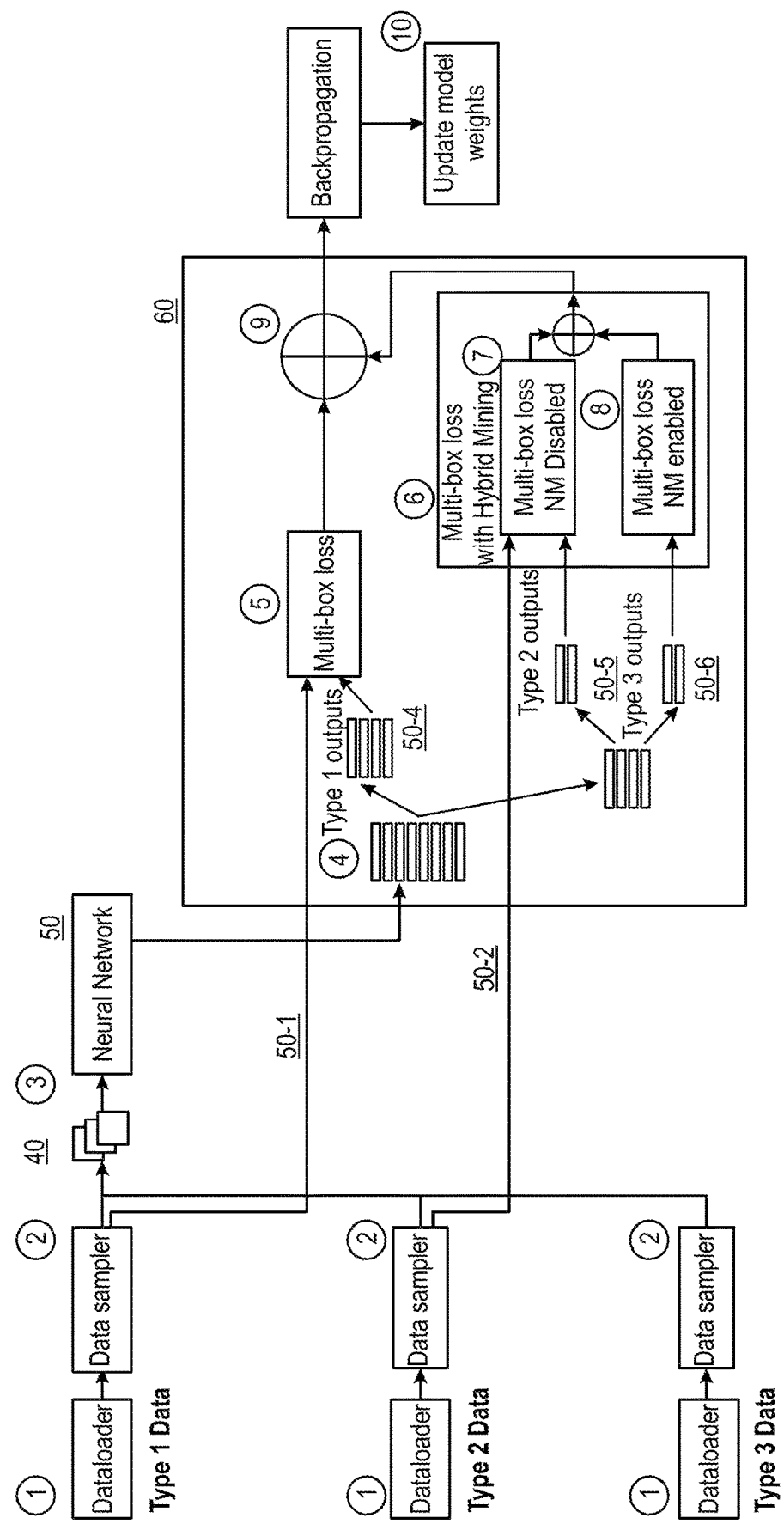
FIG. 3 illustrates a method of training a neural network according to an embodiment of the present invention.

Referring now to FIG. 3, using such a mixed dataset, a hybrid multi-box loss function 60 is used to calculate loss differently based the type of data being provided, so that in the case of Type 1 data, negative mining is employed; whereas for Type 2 data, where only some desired objects are labelled, the loss for background classes is set to 0 and negative mining is not performed.

In each batch of images from a training data set used in a training epoch, there should be sufficient images of each type defined above. In particular, the batch of images should not include more than a given proportion of Type 2 images.

It will be appreciated that by comparison to Type 1 images, Type 2 images do not provide background information during the training process. For this reason, embodiments use Type 3 data to make up for this deficiency and to help ensure there are enough negative examples.

In FIG. 3, images of each data type are processed identically by a data loader, step 1. In the present embodiment, a data sampler ensures that each batch of images for use during a training epoch has at least 50% Type 1 data and an equal amount of Type 2 to Type 3 data, although it will be appreciated that these proportions could vary in accordance with the availability of different types of data. The batch of training images 40 is passed through the neural network 50 which is to be trained. The output tensor(s) produced by the network 50 for each image of the batch are grouped 50-4, 50-5, 50-6 according to the type of originating data, step 4.

Figure 1:
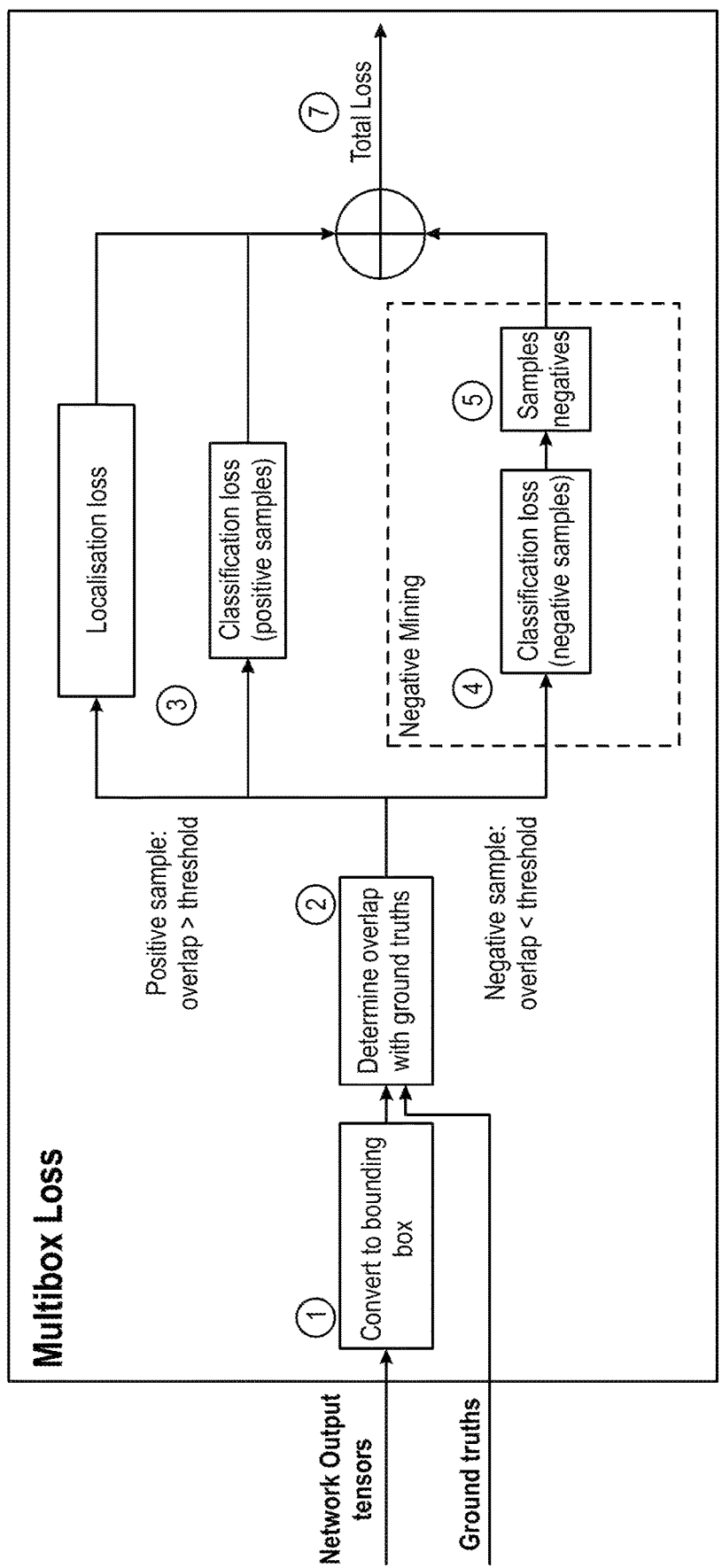
FIG. 1 illustrates the training of a network using negative mining.

Tensors 50-4 produced from Type 1 data, along with the ground truths 50-1 for the corresponding images, are passed to a standard multi-box loss stage, where negative mining is enabled, as explained in relation to FIG. 1.

Tensors produced from Type 2 and 3 data are passed to a multi-box loss stage with hybrid mining stage, step 6. Tensors 50-5 produced from Type 2 data along with the ground truths 50-2 for the corresponding images, are passed to a multi-box loss stage with negative mining disabled, as explained in relation to FIG. 1, step 7. Finally, tensors 50-6 produced from Type 3 data are passed to a multi-box loss stage with negative mining enabled, again as explained in relation to FIG. 1, step 8. (Note that the lack of ground truths for calculating loss for Type 3 data—as these images are defined by not having ground truths. The only contribution to the loss function will be from negative examples.)

In the embodiment, the number of negative samples taken from Type 3 data and used for generating loss is capped at 3 times the number of positive samples used for the Type 2 data, positive samples being default boxes which overlap with ground truths for their associated image by more than a threshold amount. Thus, Type 2 data producing a high number of potentially positive samples allows more negative samples to be taken from Type 3 data and so the number of samples taken from Type 3 data can vary from epoch to epoch according to the overall number and size of the ground truths within the batch of Type 2 data.

Once the loss function has been calculated for each of the Type 1 data as well as the Type 2 and Type 3 data, this is summed, step 9, and the sum of these loss function components is used to perform back propagation in a conventional manner, with the weights for the network 50 being updated normally, step 10.

As mentioned above, the present training method can be applied to a variety of types of neural network. For example, "M2Det: A Single-Shot Object Detector based on Multi-Level Feature Pyramid Network", Qijie Zhao, Tao Sheng, Yongtao Wang, Zhi Tang, Ying Chen, Ling Cai, Haibin Ling, arXiv:1811.04533, V1 submitted on 12 Nov. 2018 discloses an object detector particularly suited for detecting objects at different scales.

FIG. 4 shows such a network 50' being provided with a set of input images and the ground truths for those images being provided for training to the loss function with hybrid mining stage 60 described above. The network 50' produces a classification, a confidence level, that any default box corresponds with a class of interest and this information can be employed as described in relation to FIG. 3.

In this case, where a number of default boxes produced by the detector 50' overlap with a ground truth, only the default box with the highest IoU of the default box and the ground truth is taken as a positive example for use in calculating the loss function. (This will have a bearing on the number of negative examples which can be used from Type 3 data.)

FIG. 5 shows a modified version of M2Det 50" with an FCOS head as disclosed in "FCOS: Fully Convolutional One-Stage Object Detection", Zhi Tian, Chunhua Shen, Hao Chen Tong He, arxiv.org/pdf/1904.01355v5. The FCOS head outputs a classification score for each different class as well as regression values for the bounding box for each region of the image. A centeredness score determines how close a default box is to the centre of the ground truth, so that predictions further from the centre of the ground truth can be down weighted, so removing poorer predictions.

In this case, the loss function component based on centredness and bounding box regression is only non-zero for positive samples from Type 1 or Type 2 data.

In any case, it will be appreciated that the training method of FIG. 3 is readily adapted to train such any network once provided with suitable proportions of Type 1, Type 2 and Type 3 data.

Embodiments of the present invention can be implemented by expanding the programming interfaces (API) of existing machine learning toolkits, so that when training a network, they are configured to receive training data sets in which samples have been labelled as either Type 1, Type 2 or Type 3 (or such equivalent labels) data as defined above.

If only Type 1 and Type 2 data is provided, the toolkits can be configured to analyse background, unlabelled portions of Type 1 samples to produce the required number of Type 3 samples. Such samples can be expanded to the same size and resolution as the original Type 1 samples from which they are extracted using conventional still image super resolution techniques. Note that it can be useful in such cases for Type 3 samples generated from Type 1 samples from one batch only to be used with another batch of Type 1 samples.

Examples of such toolkits which can be adapted to incorporate the present invention include: Google Auto ML (cloud.google.com/automl); Python SciKit Learn (scikit-learn.org/stable/); and Weka Toolkit (www.cs.walkato.ac.nz/ml/weka/); Matlab (www.mathworks.com/products/matlab.html); IBM Watson Machine Learning; Microsoft Azure Machine Learning Studio; and Amazon Sagemaker.

While the above embodiment has been described for exemplary purposes in terms of training a neural network for classifying objects within images, it will be appreciated that the concepts described are also applicable to other forms of classifier where objects of interest are located in a "foreground" in contrast to background region(s) of the sample which may or may not contain objects in accordance with whether they are Type I (No), Type 2 (Possibly) or Type 3 (No) as described above.

For example, in a network which is trained to detect audio events within foreground portions of an audio stream, the remaining portions of the stream can be negatively mined depending on whether a given sample is annotated as: Type I, which can be negatively mined; Type 2, which should not be negatively mined, and where instead Type 3 samples should be employed which are known not to contain events of interest for negative mining.

While the above embodiments have been described in terms of data which has been positively annotated, as well as the background portions of Type I and Type 3 data which are essentially negatively annotated, it is also possible to include in Type I and Type 2 data, specific foreground regions which are negatively annotated. Thus, particularly instructive samples negatively labelled for one or more classes can be included (or added) in a training set, with appropriate calculation of the loss function during training, without being compromised by using negative mining for Type I and Type 3 data.

For example, when a doorbell camera employing a classifier which is trained to identify people and faces, wrongly recognises a car wheel as a face in acquired images, examples of such images could be used as Type 2 (negative) examples, regardless of whatever else might be present in the background of those images, for (re-)training the classifier and the weights then distributed to improve the performance of the classifier.

Equally, any Type I sample could include one or more negative ground truths which can be tested with a negative loss function.

The invention claimed is:

1. A method for training a neural network for detecting a plurality of classes of object within a sample, the method comprising:
providing a training data set comprising a plurality of samples, each annotated according to whether the samples include labelled objects of interest, where;
in a first type of samples, all objects of interest are labelled according to their class and comprise a foreground of said samples, the remainder of said samples comprising background;
in a second type of samples, some objects of interest are labelled in a foreground and their background may comprise unlabelled objects; and
a third type of samples comprise only background comprising no objects of interest;
for any given training epoch:
selecting a number of samples of each of said first, second and third type;
applying a given generation of said neural network to said selected samples to produce a respective set of one or more feature maps for each sample;
for portions of said feature maps corresponding to locations of objects labelled as being objects of a given class from said first type of samples, performing a positive loss function to determine a difference between at least one feature map value and a positive value associated with foreground;
for portions of said feature maps not corresponding to locations of objects labelled as being objects of a given class from said first type of samples, performing a negative loss function to determine a difference between at least feature map value and a negative value associated with background;
for portions of said feature maps corresponding to locations of labelled objects from said second type of samples, only performing a loss function to determine a difference between at least one feature map value and a value associated with foreground;
for limited portions of said feature maps of said third type of samples, performing a negative loss function to determine a difference between at least feature map value and a negative value associated with background; and
combining said loss function results before updating the weights for a subsequent generation of said neural network.

2. The method according to claim 1 wherein said samples comprise images and wherein said objects of interest comprise portions of said images.

3. The method according to claim 2 wherein said neural network comprises a multi-box detector in which said neural network tests regions of a sample image to produce respective feature map values for objects of each class at different scales and aspect ratios.

4. The method according to claim 3 wherein said loss function takes into account a location of a test region relative to a labelled object.

5. The method according to claim 3 wherein said loss function takes into account a centeredness of a test region relative to a labelled object.

6. The method according to claim 1 comprising generating said third type of samples for a training epoch from background portions of said first type of samples.

7. The method according to claim 1 wherein said first type of samples from which said third type of samples are generated are from another training epoch.

8. The method according to claim 1 wherein for a given epoch, samples of said first type comprise approximately 50% of said selected samples with the remaining samples being divided between said second and third type of samples.

9. The method according to claim 8 where said remaining samples are divided evenly between said second and third type of samples.

10. The method according to claim 1 wherein said step of performing a negative loss function to determine a difference between at least feature map value and a negative value associated with background in said third type of samples is performed for no more than for a limited multiple of a number of instances of performing said positive loss function to determine a difference between at least one feature map value and a positive value associated with foreground in said second type of samples.

11. The method according to claim 10 wherein said limited multiple is 3.

12. The method according to claim 1 wherein said method is responsive to said second type of samples being positively labelled as objects of a given class in said foreground to perform a positive loss function to determine a difference between at least one feature map value and a positive value associated with foreground.

13. The method according to claim 1 wherein said method is responsive to said second type of samples being negatively labelled as not being objects of a given class in said foreground to perform a negative loss function to determine a difference between at least one feature map value and a negative value associated with foreground.

14. A system for training a neural network comprising a processor configured to perform the steps of the method of claim 1.

15. A computer program product comprising a non-transitory computer readable medium, comprising instructions which when executed by a processor of a computing device are configured to perform the steps of the method of claim 1.

* * * * *